(12) United States Patent
You

(10) Patent No.: US 11,681,039 B2
(45) Date of Patent: Jun. 20, 2023

(54) FAILURE DETERMINATION APPARATUS AND METHOD OF VEHICLE RADAR APPARATUS, AND VEHICLE RADAR APPARATUS WITH THE SAME

(71) Applicant: HL KLEMOVE CORP., Incheon (KR)

(72) Inventor: Kyung Jin You, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 77 days.

(21) Appl. No.: 17/187,689

(22) Filed: Feb. 26, 2021

(65) Prior Publication Data

US 2021/0270962 A1    Sep. 2, 2021

(30) Foreign Application Priority Data

Feb. 28, 2020 (KR) ................ 10-2020-0024975

(51) Int. Cl.
  *G01S 13/931* (2020.01)
  *G01S 13/84* (2006.01)
  *G01S 7/282* (2006.01)
  *G01S 7/285* (2006.01)
  *G01S 7/02* (2006.01)

(52) U.S. Cl.
  CPC ........... *G01S 13/931* (2013.01); *G01S 7/282* (2013.01); *G01S 7/285* (2013.01); *G01S 13/84* (2013.01); *G01S 7/027* (2021.05); *G01S 2013/93271* (2020.01); *G01S 2013/93272* (2020.01)

(58) Field of Classification Search
  CPC ........ G01S 13/931; G01S 7/282; G01S 7/285; G01S 13/84; G01S 7/4008; G01S 7/4021; G01S 13/343; G01S 13/42; G01S 7/40; G01S 2013/93272; G01S 7/027; G01S 2013/93271

See application file for complete search history.

(56) References Cited

U.S. PATENT DOCUMENTS

| | | | | |
|---|---|---|---|---|
| 5,841,393 A | * | 11/1998 | Saito | G01S 13/345 342/165 |
| 6,445,335 B1 | * | 9/2002 | Tamatsu | G01S 7/4056 342/72 |
| 2018/0031691 A1 | * | 2/2018 | Kurashige | G01S 13/345 |
| 2020/0086871 A1 | * | 3/2020 | Gotoda | G01S 7/4972 |
| 2021/0165088 A1 | * | 6/2021 | Suzuki | G01S 13/343 |
| 2021/0208285 A1 | * | 7/2021 | Ulmer | H04B 17/21 |

\* cited by examiner

*Primary Examiner* — Peter M Bythrow
(74) *Attorney, Agent, or Firm* — Ladas & Parry, LLP

(57) ABSTRACT

The present disclosure relates to an apparatus and method for determining failure of a vehicle radar apparatus. In the vehicle radar apparatus, it is possible to set the normal range of the failure determination signal characteristic for each temperature by measuring the signal characteristic value at 2 or more temperature values for each transmission channel or each reception channel the normal operation state, and to determine the failure of the radar apparatus based on whether the representative value of the measured signal characteristic measured at the time of determination is within the normal range of the failure determination signal characteristic.

17 Claims, 12 Drawing Sheets

FIG.8

| Signal Characteristic \ Temperature | T1 | ... | Tn |
|---|---|---|---|
| Amplitude(A) | A1 ± α1 | ... | An ± αn |
| Phase(φ) | Φ1 ± φ1 | ... | Φn ± φn |
| ⋮ | ⋮ | ... | ⋮ |
| Frequency Deviation(Δf) | ΔF1 ± Δf1 | ... | ΔFn ± Δfn |

FAILURE DETERMINATION APPARATUS AND METHOD OF VEHICLE RADAR APPARATUS, AND VEHICLE RADAR APPARATUS WITH THE SAME

CROSS REFERENCE TO RELATED APPLICATION

This application claims priority from Korean Patent Application No. 10-2020-0024975, filed on Feb. 28, 2020, which is hereby incorporated by reference for all purposes as if fully set forth herein.

BACKGROUND OF THE INVENTION

An embodiment of the present disclosure relates to an apparatus and method for determining failure of a vehicle radar. In more detail, in order to detect irreversible performance deterioration of the transmission/reception unit among vehicle radar components, embodiments of the present disclosure provide with the apparatus and method therefor capable of determining and using a signal characteristic among the characteristics of a radar signal, a representative value and a normal range for each signal characteristic.

A radar apparatus mounted in a vehicle or the like is widely used as a sensor device for vehicle control. The radar apparatus may transmit electromagnetic waves having a predetermined frequency, receive a signal reflected from an object, and process the received signal so as to extract the position of the object, speed information, or the like.

The target information acquired by the vehicle radar may include location information including distance information and angle information, and relative speed information between the host vehicle and the target.

The vehicle radar may include an antenna unit, a signal transmission/reception unit, a signal processing unit, and the like, and the signal transmission/reception unit and the signal processing unit may be implemented as a kind of digital signal processor chip.

This vehicle radar may have different characteristics depending on the external temperature or the temperature of the chip, and it is required to compensate or supplement it appropriately.

To this end, it has been proposed the method of partially compensating or correcting a radar transmission/reception signal according to an external temperature.

This compensation or correction of the radar signal is intended to compensate for the weakening of the radar performance according to the temperature, and this assumes a state in which various elements of the radar operate normally.

However, the performance of the radar transmitter/receiver may be irreversibly changed by the changes in physical properties due to external impact, aging, etc., and this may cause a state in which it is impossible to achieve the original purpose of the radar sensor of object detection.

Therefore, it is necessary to ensure vehicle driving safety by detecting an irreversible failure of the radar transmission/reception unit and stopping the operation of the radar in that case.

On the other hand, each of the main components such as the transmission/reception unit and the signal processing unit of the radar system is a semiconductor device, and since each device has a physical difference and does not have the same performance, it is difficult to determine the irreversible failure of the radar device by using the same standard throughout the entire radar system.

Therefore, in addition to a technology for simply compensating a radar signal according to temperature, it is required a technology for determining irreversible failure of a radar system according to temperature.

SUMMARY OF THE INVENTION

In this background, an aspect of the present disclosure is to provide an apparatus and method for determining an irreversible failure of a radar apparatus.

Another aspect of the present disclosure is to provide an apparatus and method for determining irreversible failure of the signal transmission/reception unit according to temperature in a vehicle radar apparatus.

Another aspect of the present disclosure is to provide a technique for determining the irreversible failure of the transmission/reception unit of a radar device using a transmission/reception test device linked to a reception unit or a transmission unit for transmitting signals through an antenna unit in vehicle radar. apparatus Another aspect of the present disclosure is to provide an apparatus and method for setting the normal range of the failure determination signal characteristic for each temperature by measuring the signal characteristic value at 2 or more temperature values for each transmission channel or each reception channel the normal operation state, and determining the failure of the radar apparatus based on whether the representative value of the measured signal characteristic measured at the time of determination is within the normal range of the failure determination signal characteristic, in a vehicle radar apparatus.

In accordance with an aspect of the present disclosure, there is provided with an apparatus and method including transmission/reception tester linked to a receiver or transmitter for transmitting signal through antenna in a vehicle radar. The transmission/reception tester may acquire a part of the transmission signal or the reception signal for each transmission channel or each reception channel at a specific determination time, calculate a representative value of signal characteristics for each channel based on the acquired transmission signal or reception signal, and determine a failure of the corresponding transmitter or receiver if the calculated representative value of the signal characteristics is out of a normal range of a failure determination signal characteristics.

In accordance with another aspect of the present disclosure, there is provided a failure determination apparatus of a vehicle radar linked to a transmitter or a receiver for transmitting and receiving signals through a radar antenna comprising: a signal extractor configured to acquire a part of transmission signal or reception signal for each transmission channel or each reception channel at a specific determination time; a representative value calculator for calculating a representative value of signal characteristics for each channel based on the acquired transmission signal or reception signal; and a failure determiner for determining a failure of the transmitter or receiver if the calculated representative value of the signal characteristics is out of a normal range of a failure determination signal characteristics.

In accordance with another aspect of the present disclosure, there is provided a radar apparatus of a vehicle comprising: an antenna unit including a transmission antenna for transmitting a transmission signal around the vehicle and a receiving antenna for receiving a reception signal reflected from a target; a transceiver for controlling to transmit the transmission signal of a specific frequency band and to receive the reception signal through the receiving antenna; a signal processor for processing the reception signal received from the receiving antenna to acquire target information; and a failure determination apparatus linked to the transceiver for acquiring a part of the transmission signal or the reception signal for each transmission channel or each reception channel at a specific determination time, for calculating a representative value of signal characteristics for each channel based on the acquired transmission signal or reception signal, and for determining a failure of the corresponding transmitter or receiver if the calculated representative value of the signal characteristics is out of a normal range of a failure determination signal characteristics.

In this case, the signal characteristic may be at least one of amplitude, frequency, phase, amplitude deviation, frequency deviation, or phase deviation of the signal.

In addition, the normal range of the failure determination signal characteristics may be set based on a signal characteristic value measured at a constant temperature condition at which the transmitter or receiver normally operates.

The normal range of the failure determination signal characteristics may be determined by the signal characteristic values measured at two or more temperature conditions in which the transmitter or receiver normally operates, an upper margin and a lower margin.

In addition, the normal range of the failure determination signal characteristics may include a first normal range including a first signal characteristic value set in a first temperature condition, a first upper margin and a first lower margin, and a second normal range including a second signal characteristic value set in a second temperature condition, a second upper margin and a second lower margin. In this case, the first normal range and the second normal range may be different from each other.

The temperature conditions may be determined based on a temperature of a semiconductor element constituting the transmitter or the receiver of the vehicle radar.

In accordance with another aspect of the present disclosure, there is provided a failure determination method of a vehicle radar performed by a failure determination apparatus linked to a transmitter or a receiver for transmitting and receiving signals through a radar antenna comprising: acquiring a part of the transmission signal or the reception signal for each transmission channel or each reception channel at a specific determination time; calculating a representative value of signal characteristics for each channel based on the acquired transmission signal or reception signal; and determining a failure of the corresponding transmitter or receiver if the calculated representative value of the signal characteristics is out of a normal range of a failure determination signal characteristics.

As described below, according to embodiments of the disclosure, it is possible to determine irreversible failure of radar apparatus.

In addition, according to embodiments of the disclosure, it is possible to provide an apparatus and method for determining an irreversible failure of a signal transceiver according to temperature in a vehicle radar apparatus.

Furthermore, it is possible to determine an irreversible failure of the transmission/reception unit of the radar apparatus by using a transmission/reception test device linked to the receiver or a transmitter for transmitting and receiving signals through an antenna unit in a vehicle radar.

In particular, it is possible to set the normal range of the failure determination signal characteristic for each temperature by measuring the signal characteristic value at 2 or more temperature values for each transmission channel or each reception channel the normal operation state, and to determine the failure of the radar apparatus based on whether the representative value of the measured signal characteristic measured at the time of determination is within the normal range of the failure determination signal characteristic, in a vehicle radar apparatus.

BRIEF DESCRIPTION OF THE DRAWINGS

FIG. 8 illustrates the other example of setting a normal range of failure determination signal characteristics used for determining the failure of the radar according to the present embodiment.

DETAILED DESCRIPTION OF THE EXEMPLARY EMBODIMENTS

Figure 1:
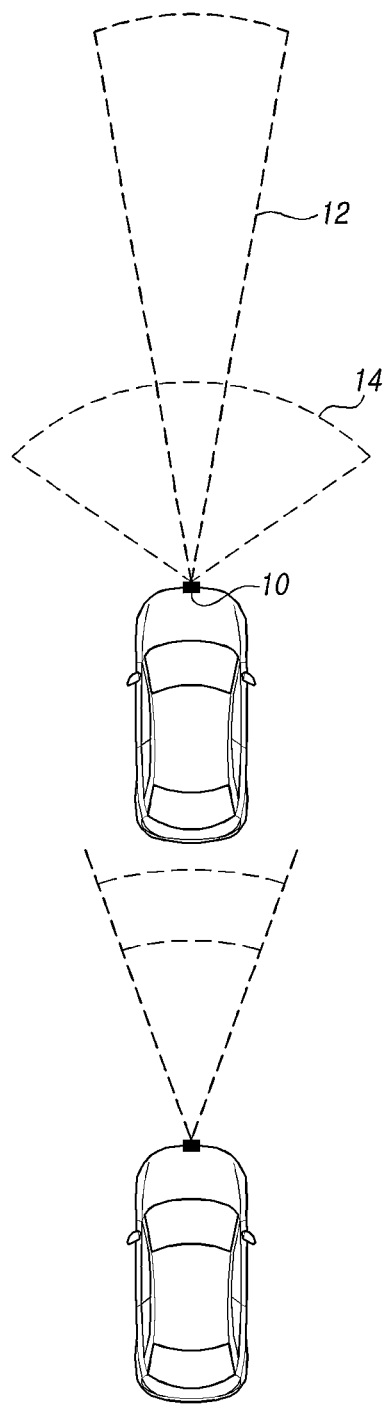
FIG. 1 illustrates an object detection method of a general vehicle radar sensor, and illustrates a medium/long-range detection area and a short-range detection area.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates an object detection method of a general vehicle radar sensor, and illustrates a medium/long-range detection area and a short-range detection area.

As shown in FIG. 1, the vehicle radar sensor is required to have both a medium/long-range detection function for detecting a long-range target in front and a short-range detection function for detecting a short-range target near the vehicle when detecting an object in the vicinity of the vehicle.

In vehicles using radar sensors, various types of driver assistance systems (DAS) may be used to assist the driver's driving.

In an adaptive cruise system (ACC) for following the preceding vehicle, it is necessary to detect a mid-to-long-range target in front of the vehicle traveling direction.

Meanwhile, in the automatic emergency braking system (AEB) or an automatic emergency steering system (AES) that for urgently braking or steering the vehicle when there is an obstacle in front, or in the lane changing assistance (LCA) system for preventing collisions with obstacles in adjacent lanes when changing lanes, it is necessary to detect near-field obstacles near the vehicle with high precision.

That is, the vehicle radar apparatus is required to measure target information such as distance, speed, and angle information of various targets in a wide range with high precision.

In particular, in a general two-dimensional road driving environment, it is necessary to accurately measure the lateral position information of the target including the distance and the horizontal angle of the target rather than vertical information.

To this end, as shown in the upper drawing of FIG. 1, the vehicle radar apparatus 10 may have a long-range detection area 12 having a relatively narrow detection angle and a long detection distance for mid-to-long-range sensing, and a wide sensing angle and a short-range detection area 14 having a wide detection angle and a small detection distance.

Such a radar apparatus for a vehicle may be required to transmit the transmission signal in a mid-to-long-range transmission beam pattern for mid-to-long-range detection, and to transmit the transmission signal in a short-range transmission beam pattern different from a medium-to-long range transmission beam pattern for short-range detection.

However, since such a radar apparatus is required to include an antenna structure and a signal processing unit of two modes according to the detection range, the structure of the radar apparatus may be complicated, and a load of the signal processing operation may increase.

In order to solve this problem, it is necessary to integrate medium/long-range radar and short-range radar in vehicle radar. In addition, in order to integrate medium/long-range radar and short-range radar, it may be considered the manner using transmission antenna for each mode and common reception antenna.

That is, as shown in the lower figure of FIG. 1, a radar apparatus having a single detection area is provided, however, by implementing different horizontal information distance resolutions according to the distance of the target, it is possible to provide a radar apparatus with a simple structure and the improved accuracy of the target horizontal information.

In addition, the vehicle radar may provide vertical direction information such as an elevation angle of an object in addition to the distance, speed, and horizontal angle of the target.

In order to estimate the elevation angle, the power of target signals received from different transmission/reception antennas may be used, or an array antenna in a vertical direction may be used.

The estimated elevation angle as described above may be used for classification of the target, and this configuration will be described in more detail based on FIGS. 5 and 6 below.

Figure 2:
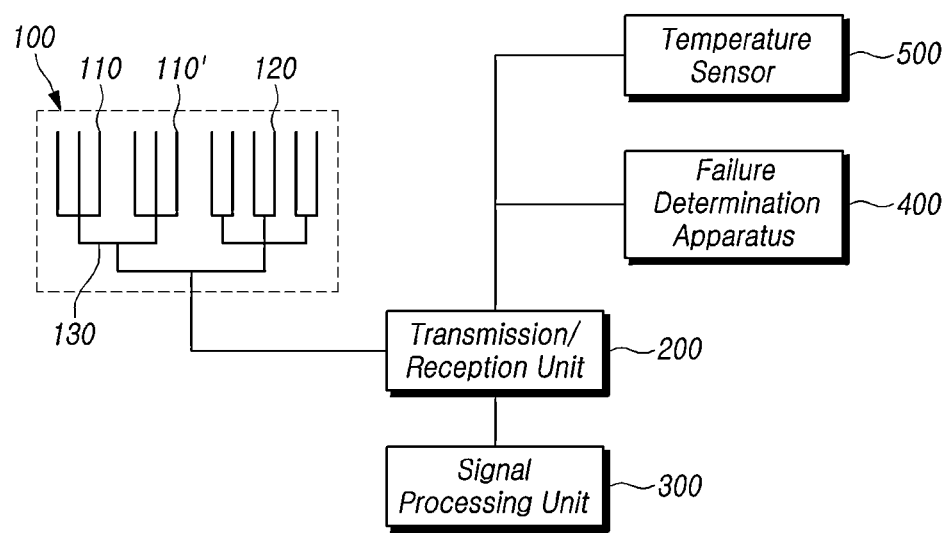
FIG. 2 illustrates the overall configuration of the vehicle radar apparatus according to the present embodiment.
Figure 3:
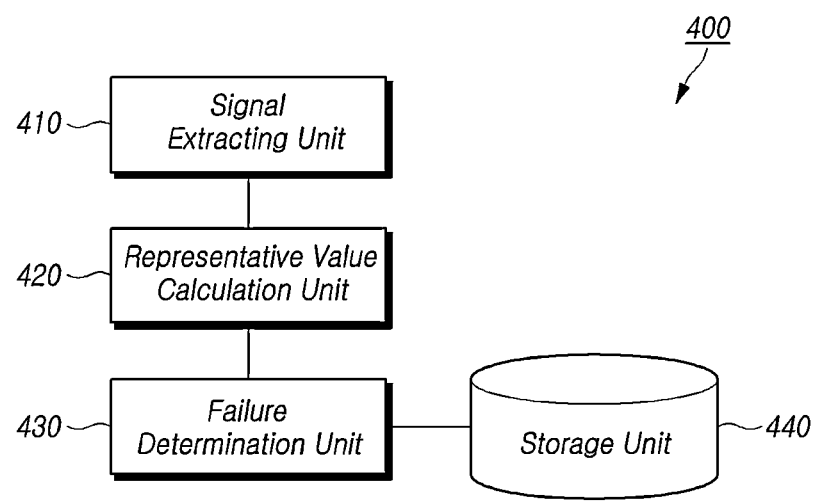
FIG. 3 illustrates a detailed configuration of a failure determination apparatus used in the vehicle radar according to the present embodiment.

FIG. 2 illustrates the overall configuration of the vehicle radar apparatus according to the present embodiment, and FIG. 3 illustrates a detailed configuration of a failure determination apparatus used in the vehicle radar according to the present embodiment.

Referring to FIG. 2, the vehicle radar apparatus according to the present embodiment may include an antenna unit 100, the signal transmission/reception unit 200 as a transceiver, the signal processing unit 300, and the failure determination apparatus 400 according to the present embodiment.

In addition, the radar apparatus may further include a temperature sensor 500 for measuring the temperature of a semiconductor element such as a component of the radar apparatus, more specifically, a chip constituting the signal transmission/reception unit 200 or the signal processing unit 300.

The antenna unit 100 may include transmission antennas 110 and 110' for transmitting the transmission signals around the vehicle and a receiving antenna 120 for receiving a reception signal reflected from an object.

In addition, the antenna unit 100 may further include the chip constituting the transmission/reception unit 200 and the signal processing unit 300, and a coupler 130 which is a signal line connecting between the transmission/reception unit 200 and the signal processing unit 300.

According to the present embodiment, one of the transmission antenna and the receiving antenna included in the antenna unit 100 may be configured to include two or more array antennas spaced apart (horizontal offset or vertical offset) by a predetermined distance in the horizontal direction or the vertical direction.

The detailed configuration of the antenna unit used in the radar apparatus according to the present embodiment will be described in more detail below with reference to FIG. 5.

Meanwhile, the transmission/reception unit 200 of the radar apparatus according to the present embodiment may be controlled to transmit the transmission signal of a specific operating frequency band and receive the reception signal through the receiving antenna.

The failure determination apparatus 400 according to the present embodiment may perform the functions for acquiring a part of the transmission signal or the reception signal for each transmission channel or each reception channel at the time of failure determination, for calculating a representative value of signal characteristics for each channel based on the obtained transmission signal or reception signal, and for determining a failure of the corresponding transmitter or receiver if the calculated representative value of the signal characteristics is out of a normal range of a failure determination signal characteristics.

The detailed configuration of the failure determination apparatus 400 according to the present embodiment will be described in more detail below based on FIGS. 3 and 4.

The signal processing unit 300 may control the signal transmission/reception unit 200 to transmit the transmission signal having a specific transmission beam pattern through the transmission antenna, and may process the reception signal received from the receiving antenna to acquire object information.

The signal processing unit 300 may be expressed in other terms such as a control unit and a signal processor, and may be implemented in the form of a digital signal processor (DSP).

Meanwhile, the radar sensor apparatus may be classified into a pulse type, a frequency modulation continuous wave (FMCW) type, and a frequency shift keying (FSK) type according to the signal type.

Among them, the FMCW type radar apparatus may use a chirp signal or a ramp signal, which is a signal whose frequency increases with time, and may determine the object's information by using time difference between the transmission wave and the reception wave and the doppler frequency shift.

More specifically, the radar apparatus may include the signal transmission/reception unit 200 for controlling signal transmission/reception through a transmission/receiving antenna, and the signal processing unit 300 for calculating target information (position, distance, angle, etc.) by using the transmission signal and the reflected signal received from the receiving antenna.

The signal transmission/reception unit 200 may include a transmitter and a receiver, and the transmitter may include an oscillator for supplying a signal to each transmission antenna to generate a transmission signal. The oscillator may include, for example, a voltage-controlled oscillator (VCO).

The receiver included in the signal transmission/reception unit 200 may include a low noise amplifier (LNA) for low-noise amplification of the reflection signal received through the receiving antenna, and a mixer for mixing the low-noise amplified reception signal, an amplifier for amplifying the mixed reception signal, and an analog digital converter (ADC) for generating reception data by digitally converting the amplified reception signal.

The detailed configuration of the signal transmission/reception unit 200 will be described in more detail below with reference to FIG. 4.

The signal processing unit 300 may include a first processing unit and a second processing unit. The first processing unit, as a pre-processor for the second processing unit, may acquire the transmission data and reception data, control the generation of the transmission signal in the oscillator based on the acquired transmission data, synchronize transmission data and reception data, and perform the frequency-conversion of the transmission data and reception data.

The second processing unit is a post-processor that performs actual processing using the processing result of the first processing unit. The second processing unit may perform a CFAR (Constant False Alarm Rate) calculations, tracking calculations, target selection calculations based on the received data frequency converted by the first processing unit so as to extract angle information, speed information, and distance information for a target. However, the present disclosure is not limited thereto, and if information on a target can be extracted, the technical idea according to the present disclosure may be applied.

The first processing unit may perform frequency conversion after data buffering the acquired transmission data and the acquired reception data in a unit sample size that can be processed per cycle. The frequency conversion performed by the above-described first processing unit may be implemented by using a Fourier transform such as a Fast Fourier Transform (FFT).

The second processing unit may perform a second Fourier transform on a first Fourier transform (FFT) signal performed by the first processing unit, and the second Fourier transform may be, for example, a Discrete Fourier Transform (DFT), in particular, a chirp-discrete Fourier transform (Chirp-DFT).

The second processor may acquire frequency values corresponding to the number of times corresponding to the second Fourier transform length K through the second Fourier transform such as Chirp-DFT. The second processing unit may detect an object by calculating the beat frequency with the greatest power during each chirp period based on the obtained frequency value, and obtaining speed information and distance information of the object based on the calculated beat frequency.

The principle of obtaining target information by the signal processing unit will be described in more detail below with reference to FIG. 6.

As shown in FIG. 3, the failure determination apparatus 400 according to the present embodiment may be a transmission/reception testing apparatus linked to a transmitter or a receiver that transmits and receives signals through the antenna unit of the radar apparatus.

Figure 4:
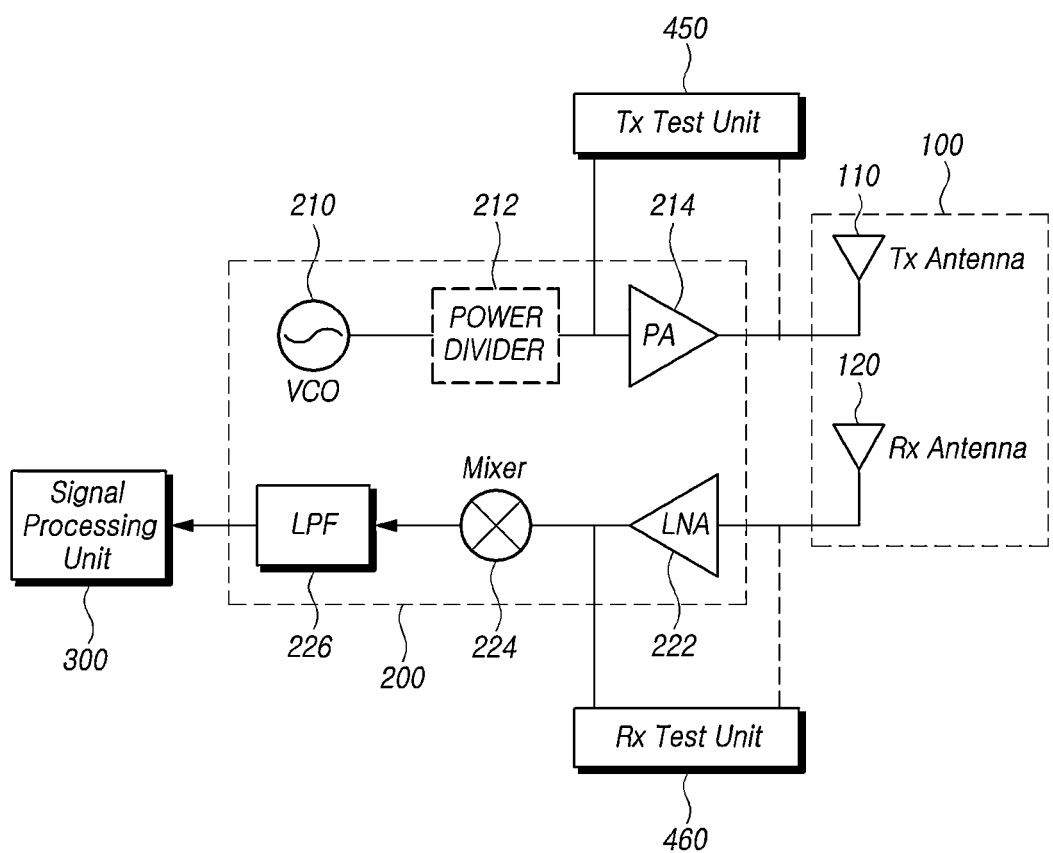
FIG. 4 illustrates a detailed configuration of a signal transceiver of the vehicle radar according to the present embodiment and the failure determination apparatus linked thereto.

As shown in FIG. 4, the failure determination apparatus 400 may include a transmission test unit 450 linked to the transmission unit or the transmitter of the radar apparatus and a reception test unit 460 linked to the reception unit or the receiver of the radar apparatus.

The failure determination apparatus 400 according to the present embodiment may have a structure in which the transmission test unit and the reception test unit are integrally integrated and linked to the transmission/reception unit.

Referring to FIG. 3, the failure determination apparatus 400 according to the present embodiment may include a signal extraction unit 410, a representative value calculation unit 420, a failure determination unit 430, and may further include a storage unit 440 for storing information on the normal range of a predetermined failure determination signal characteristic.

The signal extraction unit 410 as the signal extractor may be linked to the transmission/reception unit 200 to perform a function of acquiring a part of the transmission signal or a part of the reception signal for each transmission channel or each reception channel at a specific failure determination time point.

The signal extracting unit 410 may acquire a part of the transmission signals for each transmission channel by using an element such as the coupler 130, which is a path through which the transmission signal transfers to the transmission antennas 110 and 110' within the transmission unit.

Similarly, the signal extraction unit 410 may acquire a part of the reception signals for each reception channel by using an element such as the coupler 130, which is a path through which the reception signal received from the receiving antenna 120 transfers within the receiving unit.

The representative value calculation unit 420 may perform a function of calculating the representative value of the signal characteristic for each channel based on the acquired transmission signal or the reception signal.

In this case, the signal characteristics to be used to the calculation of the representative value may be amplitude, frequency, phase, amplitude deviation, frequency deviation, and phase deviation of the transmission signal or the reception signal.

The representative value calculation unit 420 may determine at least one of the amplitude, frequency, phase, amplitude deviation, frequency deviation, and phase deviation of the signal as the signal characteristic as a determination reference, and may calculate the representative value of the signal characteristic for the obtained transmission/reception signal.

In addition, the representative value calculation unit 420 may measure the temperature of a component of the radar apparatus at the time of calculating the representative value using the temperature sensor 500 included in the radar apparatus, and may calculate the representative value of the signal characteristic corresponding to the measured temperature.

In this case, the measured temperature may mean the temperature inside and outside the semiconductor element constituting the transmission/reception unit or the signal processing unit of the radar apparatus, or the temperature inside the housing of the radar apparatus.

As described above, conventionally, it has been proposed a technique for preventing deterioration of signal characteristics according to temperature by compensating a radar transmission/reception signal according to an ambient temperature or a temperature of a radar device.

However, it is known that the operating temperature of the semiconductor device for the radar transmission/reception unit is not highly dependent on the ambient temperature, and is more affected by the operating method of the radar device or the heat dissipation structure of the radar device than the ambient temperature.

Therefore, the embodiment utilizes the temperature inside the semiconductor device or inside the radar housing, which is an important factor when determining the irreversible failure of the radar apparatus.

For example, the representative value calculation unit 420 according to the present embodiment may determine the phase deviation ($\Delta\varphi$) from among a plurality of signal characteristics as the failure determination signal characteristic, and may calculate a measured value of the phase deviation of the transmission signal St or the reception signal Sr acquired at a specific time point t0 as the representative value of the failure determination signal characteristic at a corresponding temperature T.

In this case, when calculating the representative value from the measured value of the signal characteristic, the instantaneous measured value at a specific time point may be determined as the representative value.

Alternatively, the representative value calculation unit 420 may determine the average value of the measured values measured over a certain period as the representative value, thereby canceling the measurement error and improving the reliability of the representative value of the failure determination signal characteristic.

In addition, in the method of using the average value for a certain period, only a period in which the range of the measured temperature value is within a specific range may be used as a period for calculating the average value.

The specific period at this time may be several seconds to tens of seconds, but is not limited thereto.

In addition, in the radar device, performance deterioration may occur independently for each channel in both transmission and reception, and in particular, performance changes due to environmental factors such as temperature may differ for each channel.

Therefore, all signal monitoring and irreversible failure determination are required to be made for each transmission channel or reception channel.

Therefore, when calculating the representative value of the failure determination signal characteristic in the present embodiment, the representative value calculation unit 420 is required to calculate the representative value for each transmission channel or each reception channel. However, the representative value calculation unit 420 may calculate the same representative value for a plurality of the transmission channels or the reception channels, not for each channel, in order to collectively control the representative value of the transmission channels or the reception channels.

Meanwhile, the failure determination unit 430 of the failure determination apparatus 400 according to the present embodiment may determine the failure of the corresponding transmission unit or reception unit when the calculated representative value of the signal characteristics is out of the preset normal range of the failure determination signal characteristics.

In this case, the normal range of the failure determination signal characteristic may be defined as range information including a reference value set for a specific temperature and an upper margin and a lower margin.

In this case, the reference value in the normal range may be a signal characteristic value, which is a measurement value of a corresponding signal characteristic measured at a specific temperature in a state in which the radar apparatus operates normally, and may have a different value depending on the temperature.

Therefore, in this disclosure, the reference value in the normal range is used in the same meaning as the signal characteristic value.

In addition, the value of upper/lower margin in the normal range may be differently determined according to the reference value or temperature.

The information on the range information of the failure determination signal characteristic may be measured in advance at two or more temperatures and stored in the storage unit 440 in a state in which the radar apparatus is operating normally before the failure determination apparatus according to the present embodiment operates.

More specifically, the normal range of the failure determination signal characteristic may be determined by the signal characteristic value (i.e., the reference value) measured at two or more temperature conditions in which the transmitter or receiver of the radar apparatus normally operates, and the upper margin and the lower margin. Alternatively, the normal range of the failure determination signal characteristic may be determined by the signal characteristic value measured for each channel in a state in which the radar device operates normally, and the upper margin and the lower margin. In this case, each measured value may be used for the normal range of the failure determination signal characteristics applied for each channel, or the average of each measured value may be used for the normal range of the same failure determination signal characteristics for all channels.

For example, the normal range of the failure determination signal characteristic may include a first normal range including a first signal characteristic value set at a first temperature condition, a first upper margin, and a first lower margin, and a second normal range including a second signal characteristic values set at a second temperature condition, a second upper margin and a second lower margin.

In this case, the first normal range and the second normal range may be different from each other. That is, the first signal characteristic value (i.e., the first reference value) and the second signal characteristic value (i.e., the second reference value) may be different from each other, and the first upper margin and the first lower margin may also be different from the second upper margin and the second lower margin, respectively.

In this case, the temperature condition for determining the normal range of the failure determination signal characteristic may be determined based on the temperature of the semiconductor device constituting the transmitter or receiver of the radar apparatus.

Figure 7:
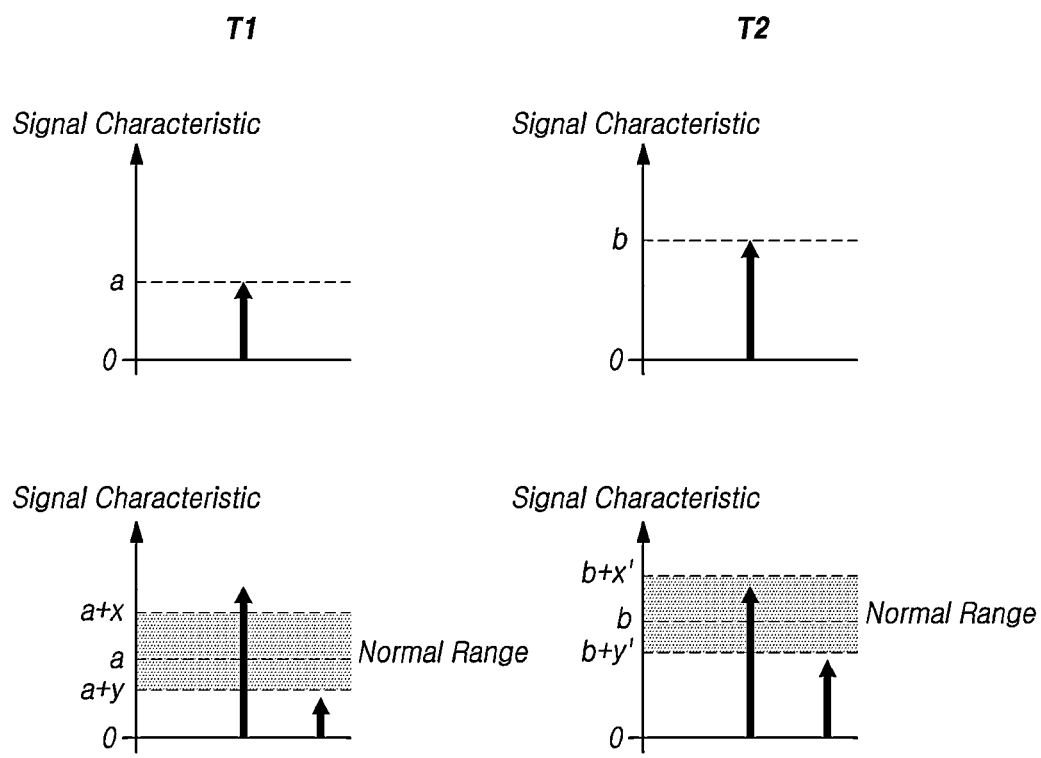
FIG. 7 illustrates an example of setting a normal range of failure determination signal characteristics used for determining the failure of the radar according to the present embodiment.
Figure 9:
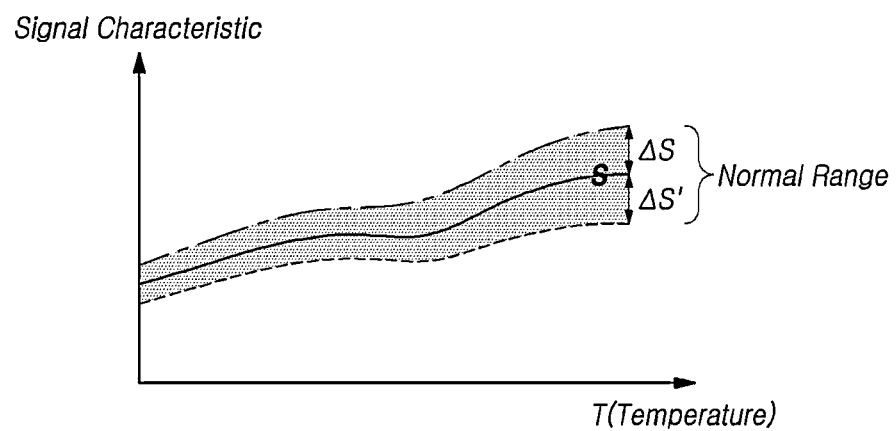
FIG. 9 illustrates another example of setting a normal range of failure determination signal characteristics used for determining the failure of the radar according to the present embodiment.

FIGS. 7 to 9 illustrate various examples of setting the normal range of failure determination signal characteristics used for radar failure determination according to the present embodiment.

Referring to FIG. 7, the normal range of the failure determination signal characteristic may include the first normal range which is defined by the first reference value (first signal characteristic value) a measured at the first temperature T1 at which the radar operates normally, the first upper margin x, and the first lower margin y. in addition the normal range of the failure determination signal characteristic may include the second normal range which is defined by the second reference value (second signal characteristic value) b measured at the second temperature T2 at which the radar operates normally, the second upper margin x' and the second lower margin y'.

As shown in FIG. 7, the first reference value a constituting the first normal range may be different from the second reference value b of the second normal range, and the upper and lower margins x, y of the first normal range may also be different from the upper and lower margins x', y' of the second normal range.

According to the embodiment of FIG. 8, the normal range of the failure determination signal characteristic may be configured in the form of a lookup-table including reference values for each signal characteristic measured in advance at each temperature, and upper and lower margin values.

That is, as shown in FIG. 8, in the state in which the radar apparatus operating normally, for each of a number of temperature conditions T1, T2, . . . , Tn, the amplitude normal range defined by the amplitude Ai as the signal characteristic and the amplitude upper and lower margins $\Delta$ai, and the phase normal range defined by the phase $\Phi$i and the phase upper and lower margins $\Delta\varphi$i, may be preset as the normal range of the failure determination signal characteristics.

In addition, the normal range of the failure determination signal characteristics may further include 1) the normal frequency range defined by the frequency Fi and the frequency upper and lower margins $\Delta$fi, 2) the amplitude deviation normal range defined by the amplitude deviation $\Delta$Ai and the upper and lower margins of the amplitude deviation $\Delta$ai, 3) the phase deviation normal range defined by the phase deviation $\Delta\Phi$i and the upper and lower margins of the phase deviation $\Delta\Phi$i, and 4) the frequency deviation normal range defined by the frequency deviation $\Delta$Fi and the upper and lower margin of the frequency deviation $\Delta$fi.

The failure determination apparatus 400 according to the present embodiment may select and use the signal characteristic having the large change according to temperature or having a large influence on temperature between a normal state and a failure state, among amplitude, phase, frequency, amplitude deviation, phase deviation, and frequency deviation.

According to the present embodiment, it is possible to accurately determine the irreversible failure of the radar apparatus at a specific temperature by selectively using at least one or more of the signal characteristics of the radar signal.

In the embodiment of FIG. 9, the normal range of the failure determination signal characteristic may be defined as a specific graph or functional relationship.

That is, an instantaneous measurement value of a specific signal characteristic may be defined as a vertical axis, and a reference value S of the signal characteristic, an upper margin $\Delta$S, and a lower margin $\Delta$S' may be continuously mapped according to a temperature change, which is a horizontal axis.

As shown in FIG. 9, the normal range may be defined as S−$\Delta$S' to S+$\Delta$S, and the upper margin $\Delta$S and the lower margin $\Delta$S' may be set differently according to the reference value S which changes according to temperature.

The failure determination unit 430 may determine that the radar apparatus is normal in the case that the representative value of the signal characteristic calculated by the representative value calculation unit 420 is within the normal range of the failure determination signal characteristic pre-defined by one of FIGS. 7 to 9.

Meanwhile, in the case that the representative value of the signal characteristic calculated by the representative value calculation unit 420 is out of the normal range of the failure determination signal characteristic pre-defined by one of FIGS. 7 to 9, the failure determination unit 430 may determine as the irreversible failure of the radar apparatus or the corresponding transmitter or receiver.

In addition, in the case that the failure determination unit 430 selects and uses at least one of the signal characteristics, if at least one of the representative values corresponding to the signal characteristics is out of the normal range of the failure determination signal characteristics, it may be determined the radar apparatus or the corresponding transmitter or receiver has an irreversible failure.

Figure 10:
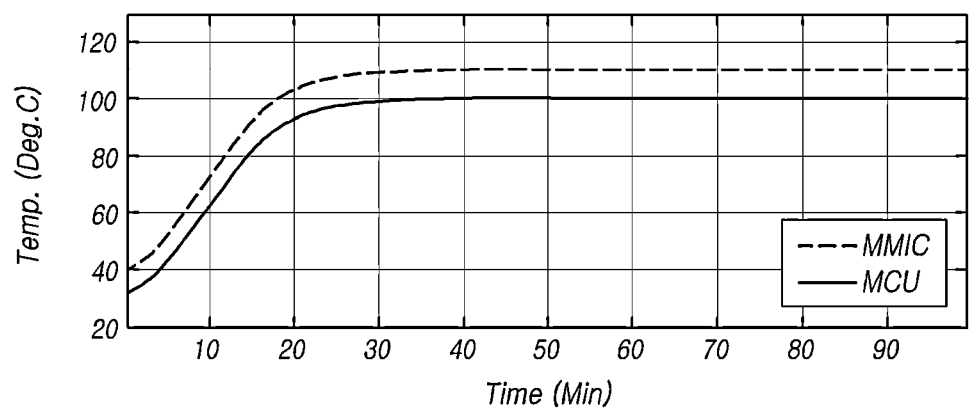
FIG. 10 illustrates the change of the phase deviation according to temperature, which is an example of signal characteristics for each channel used in the present embodiment.
Figure 10:
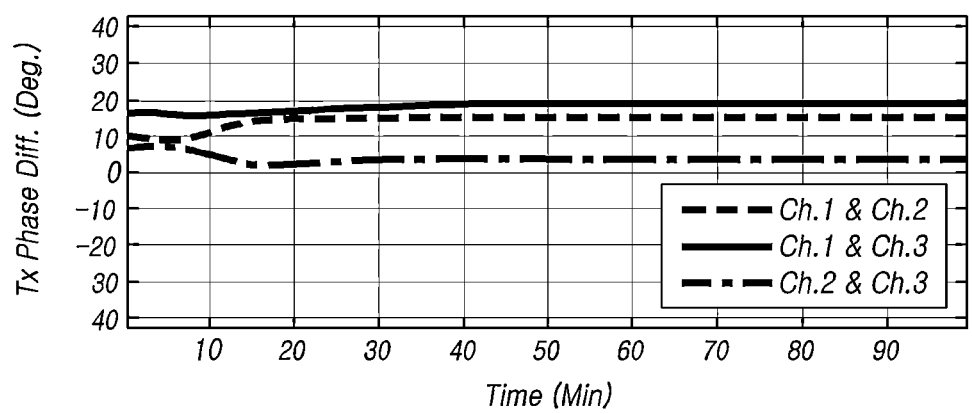

FIG. 10 illustrates the change of the phase deviation according to temperature, which is an example of signal characteristics for each channel used in the present embodiment.

In the radar apparatus according to the present embodiment, a phenomenon in which the temperature increases rapidly over time may occur, and at this time, various signal characteristics of the transmission/reception signal may fluctuate according to the temperature change.

For example, as shown in the upper drawing of FIG. 10, the temperature of the monolithic microwave integrated circuit (MMIC), which is a semiconductor device of the transceiver of the radar apparatus, and the microcontroller unit (MCU), which is a semiconductor element of the signal processing unit, may be gradually increased from 30 to 40 degrees to more than 100 degrees.

Accordingly, the phase deviation $\Delta\Phi$ as one of the signal characteristics of the transmission signal may change for each transmission channel. For example, as shown in the lower figure of FIG. 10, the phase deviation values of the transmission signals of the transmission channels CH1+CH2, the transmission channels CH1+CH3, and the transmission channels CH2+CH3 may change to a specific variation.

Accordingly, based on the characteristic change as shown in FIG. 10, according to the method of FIGS. 7 to 9, the normal range of the failure determination signal characteristic may be pre-defined according to temperature for each transmission channel.

As described above, according to the failure determination apparatus 400 according to the present embodiment, the vehicle radar apparatus can set the normal range of the failure determination signal characteristic for each temperature by measuring the signal characteristic value at 2 or more temperature values for each transmission channel or each reception channel the normal operation state, and can determine the failure of the radar apparatus based on whether the representative value of the signal characteristic measured at the time of determination is within the normal range of the failure determination signal characteristic.

The transmission/reception unit 200, the signal processing unit 300, the failure determination apparatus 400 included in the radar apparatus according to the present embodiment may be implemented as some modules of the radar control device or an ECU. Similarly, the signal extraction unit 410, the representative value calculation unit 420 and the failure determination unit 430 included in the failure determination apparatus may be also implemented as some modules of the radar control device or an ECU.

Such a radar control device or ECU may include a processor, a storage device such as a memory and a computer program capable of performing a specific function, and the failure determination apparatus 400 and the signal extraction unit 410, the representative value calculation unit 420 and the failure determination unit 430 thereof may be implemented as software modules capable of performing respective corresponding functions.

That is, the failure determination apparatus 400 according to the present embodiment, and the signal extracting unit 410, the representative value calculation unit 420, and the failure determination unit 430 included therein may be each implemented as the corresponding software module and stored in the memory. Each software module can be executed in the processing unit such as an ECU at a specific time.

FIG. 4 illustrates a detailed configuration of a signal transmission/reception unit of a vehicle radar apparatus according to the present embodiment and the failure determination apparatus linked thereto.

The signal transmission/reception unit 200 used in the radar apparatus according to the present embodiment may transmit a linear frequency modulated signal through the antenna unit under the control of the signal processing unit 300 and receive the reception signal reflected from an object.

As shown in FIG. 4, the signal transmission/reception unit 200 may include the transmitter including the voltage controlled oscillator (VCO) 210, the power divider 212, and the power amplifier 214 at the transmission side.

The voltage controlled oscillator 212 performs a function of generating a sine wave of a specific frequency by control of the pulse modulation controller, and the power divider 212 performs the switching and power distribution to the plurality of transmission antennas or receiving antennas.

In addition, the power amplifier 214 functions to amplify the amplitude of the transmission wave transmitted through the transmission antenna.

In addition, the signal transmission/reception unit 200 may include the receiver including the low noise amplifier (LNA) 222 for amplifying a signal received from the receiving antenna 120 with low noise, the mixer 224 for mixing a transmission signal and a reception signal, and the low-pass filter (LPF) 226.

The mixer 224 performs a function of generating a bit signal by convolving the transmission wave and the reception wave corresponding thereto.

The low-pass filter 226 performs a function of passing only a low frequency component corresponding to the bit frequency of the beat signal generated by the mixer.

The signal transmission/reception unit 200 may operate under the control of the signal processing unit 300.

Meanwhile, as shown in FIG. 4, the failure determination apparatus 400 according to the present embodiment may include the transmission test unit 450 linked to the transmitter of the signal transmission/reception unit and the reception test unit 460 linked to the receiver.

As described above, the transmission test unit 450 and the reception test unit 460 may be integrated to be implemented as a single failure determination apparatus.

Figure 6:
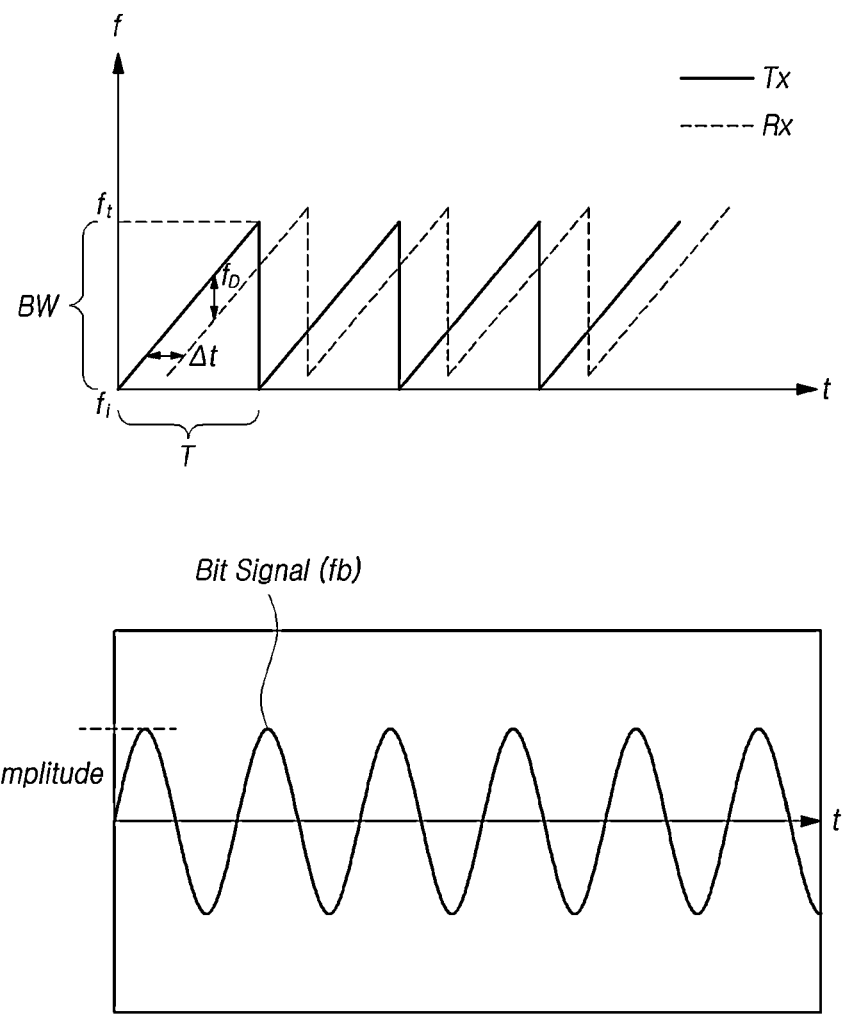
FIG. 6 illustrates an example of a signal waveform and a distance detection principle in a frequency modulated continuous wave (FMCW) radar as an example of the radar apparatus according to the present embodiment.

FIG. 6 illustrates an example of a signal waveform and a distance detection principle in a frequency modulated continuous wave (FMCW) radar as an example of the radar apparatus according to the present embodiment.

The signal modulation scheme for the FMCW radar can be implemented in several forms, the most representative of which is to use the sawtooth signal waveform as shown in FIG. 6.

That is, The FMCW radar may repeatedly generate and transmit up-chirp signals in which the frequency increases linearly from the start frequency fi to the end frequency ff during the sweep time or sweep repetition period T, which is a constant time period, and may receive the reception signal reflected from the object.

In this disclosure, the sweep time may be used in the same meaning as the modulation period.

In FIG. 6, the solid line represents the transmission waveform and the dotted line represents the reception waveform.

In this sawtooth signal model, one chirp signal has an individual frequency band BW, which is a difference (ff-fi) between the end frequency and the start frequency, and the start frequencies of all chirp signals are the same as fi.

As shown in FIG. 6, the transmission wave (solid line) and the reception wave (dotted line) have the same shape, but have specific shifts along the time axis and the frequency axis.

The distance and relative speed of the object may be calculated by using the time shift or frequency shift between the transmission wave and the reception wave.

More specifically, when the transmission wave and the reception wave are mixed (i.e., convoluted), the beat signal as shown in the lower figure of FIG. 6 is generated, and this bit signal is in the form of a sine wave having a specific bit frequency (fb).

In this case, the bit frequency fb of the bit signal has a value proportional to the distance R to the object, and specifically, the distance R to the object may be determined as in Equation 1 below.

$$R = \frac{fb \cdot T \cdot c}{2 \cdot BW} \qquad \text{[Equation 1]}$$

In Equation 1, BW denotes the individual frequency bandwidth of the chirp signal, T denotes the sweep time, c denotes the speed of light, and fb denotes the bit frequency of the bit signal.

As described above, in the sawtooth waveform model of FIG. 6, a distance to an object can be calculated by using a sawtooth shaped repetitive chirp signal, generating the beat signal by mixing the transmission wave and the reception wave, and then measuring the beat frequency.

The radar apparatus according to the present embodiment is not limited to the signal type, modulation method, and target information acquisition principle as shown in FIG. 6, and other methods may be used.

Figure 5:
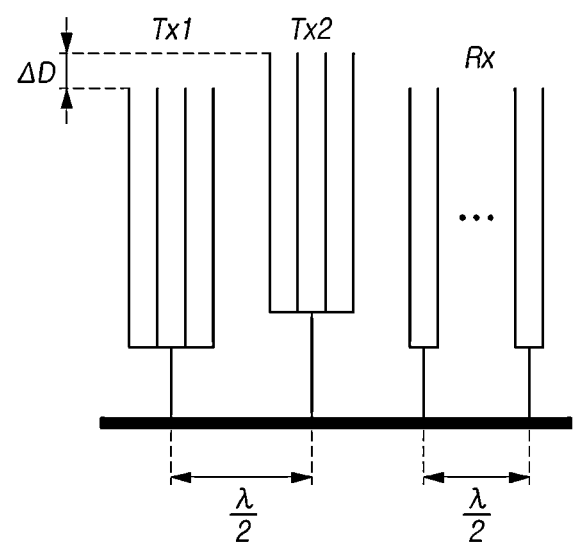
FIG. 5 illustrates an embodiment of an antenna unit included in the vehicle radar apparatus according to the present embodiment.

FIG. 5 illustrates an embodiment of an antenna unit included in the vehicle radar apparatus according to the present embodiment.

Referring to FIG. 5, the antenna unit 100 may include two transmission antennas Tx1, Tx2 and a plurality of receiving antennas Rx, and the two transmission antennas Tx1 and Tx2 are vertically spaced apart by a specific distance ΔD and the plurality of receiving antennas Rxi have the same vertical position.

Each of the transmission antenna and the receiving antenna may have a structure in which 2, 4, or 6 array antennas extend to one direction while having one feed point, but is not limited thereto.

Each of the array antennas constituting the transmission antenna and receiving antennas may be composed of a plurality of elements or patches connected to the output line of the distributor, may extend in an upper direction (upper direction among the vertical directions) with a feed port connected to a chip including a controller or an input port of a distributor as a starting point.

For example, the two transmission antennas Tx1 and Tx2 constituting the transmission antenna unit may be arranged to be spaced apart by a half of the transmission signal wavelength 0.5λ in the horizontal direction (second direction) perpendicular to the vertical direction (first direction), which is the extension direction of each array antenna. In addition, the plurality of reception antennas Rxi constituting the receiving antenna unit may also be arranged to be spaced apart by a half 0.5λ of the wavelength of the transmission signal.

In this way, by setting the horizontal distance between the transmission antenna or the receiving antenna as a half 0.5λ of the wavelength of the transmission signal, it is possible to remove the angle ambiguity caused by the grating lobe.

That is, the grating lobe may occur because the distance between the receiving antennas is more than half 0.5λ of the wavelength of the transmission signal. However, it is possible to minimize angle ambiguity due to the grating lobe by arranging the horizontal distance between the receiving antennas at 0.5λ, and comparing and compensating the angle information extracted from the channels of each receiving antenna.

For example, as shown in FIG. 5, if two transmission antennas Tx1 and Tx2 are vertically offset by a specific distance in the vertical direction, the phase difference may generate due to the vertical offset between the first reception signal transmitted at Tx1 and received at the receiving antenna and the second reception signal transmitted at Tx2 and received at the receiving antenna.

Therefore, the distance to the target can be calculated using the time difference between the transmission time and the reception time, and the vertical information of the target can be calculated using the phase difference between the transmission signal, the first reception signal and the second reception signal The antenna unit 100 used in the radar apparatus according to the present embodiment is not limited to the embodiment of FIG. 5.

In addition, the radar apparatus according to the present embodiments can employ a signal transmission and reception technique based on a multidimensional antenna array and a multiple input multiple output (MIMO) in order to form a virtual antenna aperture greater than an actual antenna aperture.

For example, a two-dimensional antenna array can be employed to accomplish the accuracy of an angle to the vertical and/or the horizontal and a higher resolution. In case the two-dimensional radar antenna array is used, signals are transmitted and received by two separate scans (time multiplexed) horizontally and vertically, and the MIMO can be used separately from the horizontal and vertical scans (time multiplexed) by the two-dimensional antenna array.

More specifically, the radar apparatus according to one or more embodiments can comprise a two-dimensional antenna array including a transmission antenna assembly including a total of 12 transmission antennas Tx and a receiving antenna assembly including a total of 16 receiving antennas Rx; as a result, a total of 192 virtual receiving antennas can be arranged.

Further, in another embodiment, in a case where the antenna assembly of the radar sensor comprises the two-dimensional antenna array, each antenna patch can be disposed in a diamond or rhombus shape; therefore, unnecessary side lobes can be reduced.

Alternatively, the two-dimensional antenna arrangement can comprise a V-shape antenna array in which a plurality of radiating patches is arranged in a V-shape, and more specifically, comprise two V-shape antenna arrays. In this case, a single feed is performed to the apex of each V-shape antenna array.

Alternatively, the two-dimensional antenna arrangement can comprise a X-shape antenna array in which a plurality of radiating patches is arranged in a X-shape, and more specifically, comprise two X-shape antenna arrays. In this case, a single feed is performed to the center of each X-shape antenna array.

Further, the radar apparatus according to one or more embodiments can employ the MIMO antenna system to accomplish the accuracy of an angle to the vertical and/or the horizontal and a higher resolution.

More specifically, in the MIMO system, each transmission antenna can transmit a signal with a waveform independent of one another. That is, each transmission antenna can transmit a signal with a waveform independent of the other transmission antenna(s), and then each receiving antenna can determine which transmission antenna a received signal from an object is transmitted from due to the using of the independent waveform for each transmission antenna.

Further, the radar apparatus according to one or more embodiments can comprise a radar housing in which a substrate on which the antenna assembly is disposed and a circuitry are accommodated, and a radome served as an enclosure of the radar housing. The radome can be formed of a material capable of decreasing attenuation of radar signals transmitted and received, and constitute a front or rear bumper, a grille, or a side body of the vehicle, or an exterior surface of one or more components of the vehicle.

That is, the radome of the radar apparatus can be disposed inside of the bumper, the grille, or the body of the vehicle, or be disposed as a part of a component constituting the exterior surface of the vehicle, such as a part of the bumper, the grille, or the body of the vehicle. Therefore, the radome can improve the aesthetics of the vehicle and provide the convenience of mounting the radar sensor.

The radar sensor or the radar apparatus/system according to the present disclosure can comprise one or more of a front detection radar sensor mounted in the front of the vehicle, a rear detection radar sensor mounted in the rear of the vehicle, and a side or side-rear detection radar sensor mounted in a side of the vehicle, which can constitute at least one radar sensor subsystem.

The radar sensor or the radar apparatus/system can process data by analyzing a transmitting signal and a receiving signal, and as a result, extract information on an object. To do this, the radar sensor or the radar sensor apparatus/system can comprise an electronic or controlling circuitry ECU, or a processor. Data transmission or signal communication from the radar sensor to the electronic or control circuitry ECU or the processor can use a communication link, such as a vehicle network bus, or the like.

Figure 11:
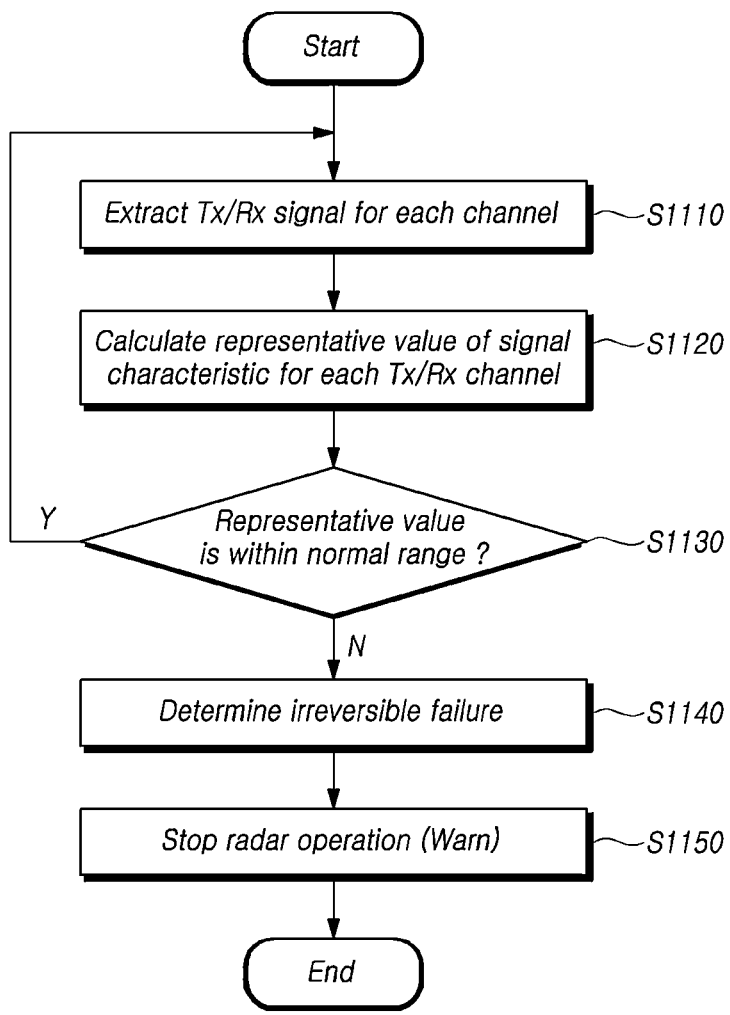
FIG. 11 is a flowchart illustrating the overall flow of a method for determining the failure of the radar according to the present embodiment.

FIG. 11 is a flowchart illustrating the overall flow of a method for determining the failure of the radar according to the present embodiment.

The method for determining the failure of the radar according to the present embodiment may be performed by the failure determination apparatus linked to a transmitter or a receiver for transmitting and receiving signals through a radar antenna unit. The method for determining the failure of the radar according to the present embodiment may including acquiring a part of the transmission signal or the reception signal for each transmission channel or each reception channel at a specific determination time (S1110), calculating a representative value of signal characteristics for each channel based on the acquired transmission signal or reception signal (S1120), and determining a failure of the corresponding transmitter or receiver if the calculated representative value of the signal characteristics is out of a normal range of a failure determination signal characteristics (S1130).

The determining the failure may include determining whether the calculated representative value of the signal characteristics is within the preset normal range of the failure determination signal characteristic (S1130), and determining that the radar apparatus or the transmitter and receiver constituting the same has an irreversible failure if the representative value of the signal characteristics is out of the normal range (S1140).

In addition, in the case that it is determined as the irreversible failure, the step of stopping the operation of the radar device and warning may be further included (S1150).

The calculation of the representative value of the signal characteristic and the setting of the normal range of the failure determination signal characteristic in the failure determination method of the radar apparatus may be performed using the configuration described based on FIGS. 3 to 10.

Figure 12:
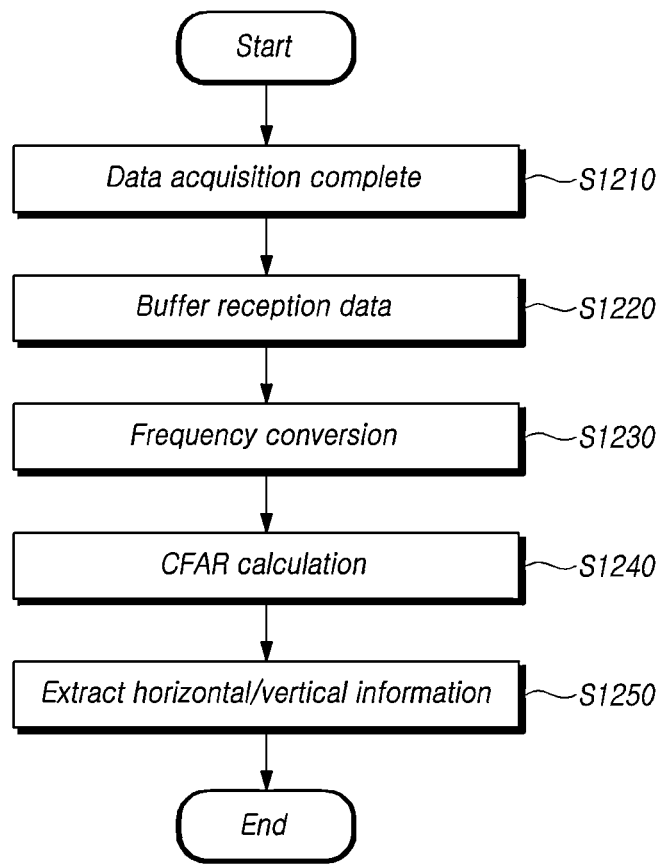
FIG. 12 is a flowchart of a signal processing method provided by the radar apparatus according to the present embodiment.

FIG. 12 is a flowchart of a signal processing method provided by the radar apparatus according to the present embodiment.

FIG. 12 is a flowchart illustrating a signal processing process after receiving the reflection signal from the target is completed. The radar apparatus may buffer the reception data obtained in the data acquisition completion step (S1210) in a unit sample size that can be processed per cycle (S1220), and then performs frequency conversion (S1230).

Thereafter, CFAR (Constant False Alarm Rate) calculation (S1240) is performed based on the frequency-converted reception data, and vertical/horizontal information, speed information, and distance information for the target are extracted (S1250). The frequency conversion in the frequency conversion step S1230 may use a Fourier transform such as a Fast Fourier Transform (FFT).

According to the present embodiments, it is possible to provide with the effect of determining irreversible failure at a specific temperature for each of the transmitting/receiving channels of the radar apparatus by using a failure determination device linked to a transmitter or the receiver of the vehicle radar apparatus.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module(s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A failure determination apparatus of a vehicle radar connected to a transmitter or a receiver for transmitting and receiving signals through a radar antenna, the failure determination apparatus comprising one or more processors configured to:
   acquire at least a part of transmission signal or reception signal for each transmission channel or each reception channel;
   calculate a representative value of signal characteristics for each channel based on the acquired transmission signal or reception signal; and,
   select one normal range among a plurality of normal ranges based on a temperature sensed by a temperature sensor, each normal range defined by a respective signal characteristic value, a respective upper margin, and a respective lower margin which correspond to a respective temperature, and determine a failure of the transmitter or receiver if the calculated representative value of the signal characteristics is out of the selected one normal range defined by a signal characteristic value, a upper margin, and a lower margin which correspond to the temperature sensed by the temperature sensor.

2. The failure determination apparatus of the vehicle radar of claim 1, wherein the signal characteristic is at least one of amplitude, frequency, phase, amplitude deviation, frequency deviation, or phase deviation of the signal,
   wherein the representative value of the signal characteristic is calculated as a value corresponding to the sensed temperature of the signal characteristic determined as a reference for determining failure.

3. The failure determination apparatus of the vehicle radar of claim 1, wherein the plurality of normal ranges of the failure determination signal characteristics are set based on signal characteristic values measured at a plurality of temperature conditions at which the transmitter or receiver normally operates.

4. The failure determination apparatus of the vehicle radar of claim 1, wherein the plurality of the normal ranges of the failure determination signal characteristics include a first normal range including a first signal characteristic value, a first upper margin and a first lower margin, which are set in a first temperature condition, and a second normal range including a second signal characteristic value a second upper margin and a second lower margin, which are set in a second temperature condition.

5. The failure determination apparatus of the vehicle radar of claim 4, wherein the first normal range and the second normal range are different from each other.

6. The failure determination apparatus of the vehicle radar of claim 3, wherein the temperature conditions are determined based on a temperature of a semiconductor element constituting the transmitter or the receiver of the vehicle radar.

7. A radar apparatus of a vehicle comprising:
   an antenna unit including a transmission antenna for transmitting a transmission signal around the vehicle and a receiving antenna for receiving a reception signal reflected from a target;
   a transceiver configured to control to transmit the transmission signal of a specific frequency band and to receive the reception signal through the receiving antenna;
   a signal processor configured to process the reception signal received from the receiving antenna to acquire target information; and,
   a failure determination apparatus connected to the transceiver and configured to acquire at least a part of the transmission signal or the reception signal for each transmission channel or each reception channel, calculate a representative value of signal characteristics for each channel based on the acquired transmission signal or reception signal, select one normal range among a plurality of normal ranges based on a temperature sensed by a temperature sensor, each normal range defined by a respective signal characteristic value, a respective upper margin, and a respective lower margin which correspond to a respective temperature, and determine a failure of the transmitter or receiver if the calculated representative value of the signal characteristics is out of the selected one normal range defined by a signal characteristic value, a upper margin, and a lower margin which correspond to the temperature sensed by the temperature sensor.

8. The radar apparatus of claim 7, wherein the signal characteristic is at least one of amplitude, frequency, phase, amplitude deviation, frequency deviation, or phase deviation of the signal,
   wherein the representative value of the signal characteristic is calculated as a value corresponding to the sensed temperature of the signal characteristic determined as a reference for determining failure.

9. The radar apparatus of claim 7, wherein the plurality of normal ranges of the failure determination signal characteristics are set based on signal characteristic values measured at a plurality of temperature conditions at which the transmitter or receiver normally operates.

10. The radar apparatus of claim 7, wherein the plurality of normal ranges of the failure determination signal characteristics includes a first normal range including a first signal characteristic value, a first upper margin and a first lower margin, which are set in a first temperature condition, and a second normal range including a second signal characteristic value, a second upper margin and a second lower margin, which are set in a second temperature condition.

11. The radar apparatus of claim 9, wherein the plurality of temperature conditions are determined based on a temperature of a semiconductor element constituting the transmitter or the receiver of the vehicle radar.

12. A failure determination method of a vehicle radar performed by a failure determination apparatus connected to a transmitter or a receiver for transmitting and receiving signals through a radar antenna, the method comprising:
   acquiring at least a part of the transmission signal or the reception signal for each transmission channel or each reception channel;
   calculating a representative value of signal characteristics for each channel based on the acquired transmission signal or reception signal;
   selecting one normal range among a plurality of normal ranges based on a temperature sensed by a temperature sensor, each normal range defined by a respective signal characteristic value, a respective upper margin, and a respective lower margin which correspond to a respective temperature; and
   determining a failure of the transmitter or receiver if the calculated representative value of the signal characteristics is out of the selected one normal range defined by a signal characteristic value, an upper margin, and a lower margin which correspond to the temperature sensed by the temperature sensor.

13. The failure determination method of claim 12, wherein the signal characteristic is at least one of amplitude, frequency, phase, amplitude deviation, frequency deviation, or phase deviation of the signal,
  wherein the representative value of the signal characteristic is calculated as a value corresponding to the sensed temperature of the signal characteristic determined as a reference for determining failure.

14. The failure determination method of claim 12, wherein the plurality of normal ranges of the failure determination signal characteristics are set based on signal characteristic values measured at a plurality of temperature conditions at which the transmitter or receiver normally operates.

15. The failure determination apparatus of the vehicle radar of claim 1, wherein the temperature sensor is disposed inside a housing of the vehicle radar.

16. The failure determination apparatus of the vehicle radar of claim 15, wherein the temperature sensor is configured to sense an inside or outside of one or more components of the vehicle radar.

17. The failure determination apparatus of the vehicle radar of claim 15, wherein the temperature sensor is configured to estimate an inside of one or more semiconductor components of the vehicle radar.

* * * * *